United States Patent
Schmidt et al.

(10) Patent No.: US 7,766,402 B2
(45) Date of Patent: Aug. 3, 2010

(54) BUMPER MOUNTING SYSTEM

(75) Inventors: Leo M. Schmidt, Seattle, WA (US); James E. Schatzer, Maple Valley, WA (US); Erik David Hjorten, Everett, WA (US); Richard D. Wailes, Jr., Bothell, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 12/024,469

(22) Filed: Feb. 1, 2008

(65) Prior Publication Data

US 2008/0211242 A1  Sep. 4, 2008

Related U.S. Application Data

(60) Provisional application No. 60/887,725, filed on Feb. 1, 2007.

(51) Int. Cl.
*B60R 19/48* (2006.01)

(52) U.S. Cl. .................. 293/117; 293/155; 296/193.09; 296/193.11; 180/69.21

(58) Field of Classification Search .................. 293/155, 293/102, 117, 118, 154; 296/193.09, 193.1, 296/193.11; 180/69.02, 69.2, 69.21; *B60R 19/48*
See application file for complete search history.

(56) References Cited

U.S. PATENT DOCUMENTS

| | | | |
|---|---|---|---|
| 3,017,944 A * | 1/1962 | Norrie ..................... | 180/69.21 |
| 3,171,156 A * | 3/1965 | Peras .......................... | 16/235 |
| 4,658,470 A * | 4/1987 | Oen ............................ | 16/241 |
| 5,435,406 A * | 7/1995 | Gaffoglio et al. ........ | 180/69.21 |
| 5,645,133 A * | 7/1997 | Thompson et al. ....... | 180/69.21 |
| 5,890,556 A * | 4/1999 | Shearn et al. ............ | 180/69.21 |
| 6,394,211 B1 * | 5/2002 | Palenchar et al. ........ | 180/69.21 |
| 7,086,673 B2 * | 8/2006 | Connett et al. .............. | 293/118 |

\* cited by examiner

*Primary Examiner*—Glenn Dayoan
*Assistant Examiner*—Pinel E Romain
(74) *Attorney, Agent, or Firm*—Christensen O'Connor Johnson Kindness PLLC

(57) ABSTRACT

A bumper mounting system (10) for locating and installing a bumper (14) on a vehicle having a chassis and a hood (18) includes a chassis support member (42) pivotally mountable to a portion of the vehicle hood (18) and adjustably mountable to a portion of the vehicle chassis. The system also includes a bumper mounting member (46) mountable to both an interior portion of the bumper (14) and a portion of the chassis support member (42). The system further includes a first bumper support feature (114) formed on the chassis support member (42) and a second bumper support feature (118) formed on the bumper mounting member (46). The second bumper support feature (118) is engageable with the first bumper support feature (114) to at least temporarily position the bumper (14) relative to the hood (18).

20 Claims, 4 Drawing Sheets

BUMPER MOUNTING SYSTEM

CROSS-REFERENCE TO RELATED APPLICATION

This application claims the benefit from U.S. Provisional Patent Application No. 60/887,725 filed on Feb. 1, 2007, the specification of which is hereby expressly incorporated by reference.

BACKGROUND

Heavy-duty (HD) vehicles, such as Class 8 trucks, are often assembled to accommodate specific customer requirements and requests. Satisfying these requirements and requests often requires manual assembly of at least some of the components. Reducing the amount of time or labor needed to manually install a particular part results in reduced assembly costs and higher output. Traditionally, installing the bumper of an HD vehicle requires two persons and a significant amount of time to properly locate and install the bumper on the vehicle frame.

In a typical installation of a bumper on an HD vehicle, the hood is first properly located on the vehicle frame such that the hood to cab cowl gap is within predetermined standards. After the hood is suitably located and installed, the bumper is then positioned such that the hood to bumper gap is within predetermined standards. Because the hood position is normally unique for each vehicle, the installer must subjectively determine whether the bumper is in an appropriate position relative to the hood and whether the hood to bumper gap is acceptable, leading to increased assembly time and lower output.

In addition to the increased time needed for subjectively locating the bumper, actual installation of the bumper normally requires at least two people. After the bumper is properly located on the vehicle frame as described above, a first person must hold the bumper in position while a second person retrieves fasteners and secures the bumper to the vehicle frame.

It is desired to have a bumper mounting system that properly locates the bumper after hood adjustment while minimizing reliance on the subjective determination of the installer and reducing the number of persons required for the installation.

SUMMARY

A bumper mounting system for locating and installing a bumper on a vehicle having a chassis and a hood includes a chassis support member pivotally mountable to a portion of the vehicle hood and adjustably mountable to a portion of the vehicle chassis. The system also includes a bumper mounting member mountable to both an interior portion of the bumper and a portion of the chassis support member. The system further includes a first bumper support feature formed on the chassis support member and a second bumper support feature formed on the bumper mounting member. The second bumper support feature is engageable with the first bumper support feature to at least temporarily position the bumper relative to the hood.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
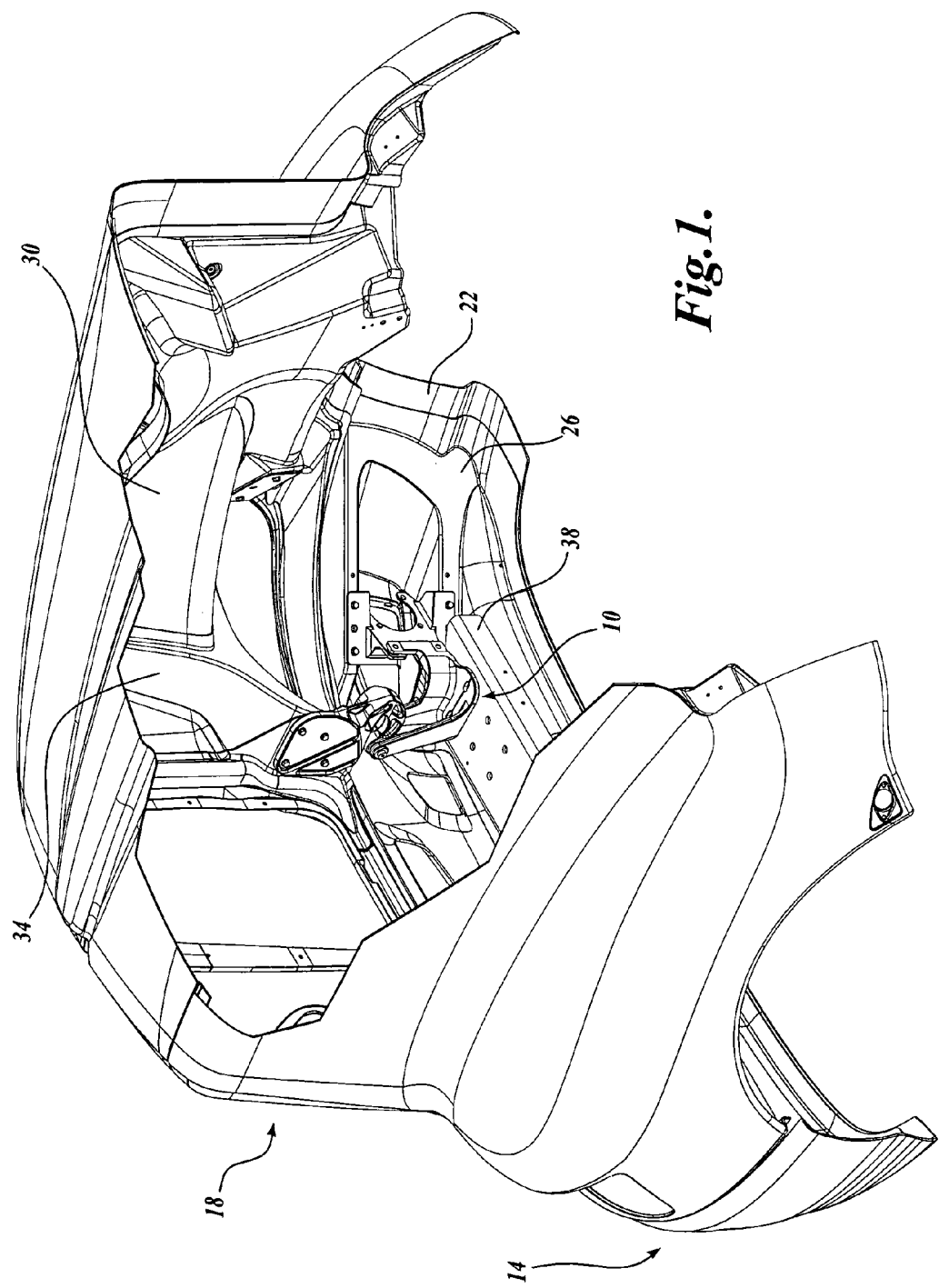
FIG. 1 is an isometric view of a vehicle bumper and hood assembly having a bumper mounting system constructed in accordance with one embodiment of the present disclosure.

A bumper mounting system 10 suitable for use with a well-known heavy-duty (HD) vehicle or other suitable vehicle is best seen by referring to FIG. 1. The bumper mounting system 10 aids an operator when installing the bumper on a vehicle frame, or chassis, and enables the operator to accurately locate the bumper on the vehicle relative to the position of the vehicle hood. The bumper mounting system 10 is shown in use with an HD vehicle; however, it should be appreciated that the bumper mounting system 10 can be used with the hood and bumper of any suitable vehicle.

Referring to FIG. 1, the vehicle includes a bumper 14 and a hood 18 that are adapted to be secured to the vehicle chassis. Bumper 14 includes left and right bumper exterior skins 22 and left and right bumper reinforcements 26. The hood 18 similarly includes left and right hood exterior skins 30 and left and right hood reinforcements 34. The exterior skins 22 and 30 are made from any suitable material, such as fiberglass, in any suitable manner well known in the art. Moreover, any preferred bumper or hood design may be used without departing from the spirit and scope of the present disclosure. The bumper reinforcements 26 are coupled to the interior surface of the bumper exterior skins 22 and provide structural support to the bumper 14, and the hood reinforcements 34 are secured to the interior surface of the hood exterior skins 30 and provide support to the hood 18. The reinforcements 26 and 34 are likewise made in any suitable manner and from an appropriate material, such as steel. It should be appreciated that the hood 18 and bumper 14 may be constructed in any well known manner in the art; and therefore, the hood 18 and bumper 14 described and illustrated in the FIGURES should be seen as illustrative only, and should not be taken as limiting the scope of the present disclosure.

Although only one bumper mounting system 10 is shown in the FIGURES, it is preferred that two bumper mounting systems 10 are utilized to mount a bumper. In the preferred embodiment, a first bumper mounting system 10 is mounted to the left bumper and hood reinforcements 26 and 34, and a second bumper mounting system 10 is mounted to the right bumper and hood reinforcements 26 and 34. Optimally, the first and second bumper mounting systems 10 are substantially identical and mirror each other; and therefore, only a single bumper mounting system 10 will be hereinafter described.

Figure 2:
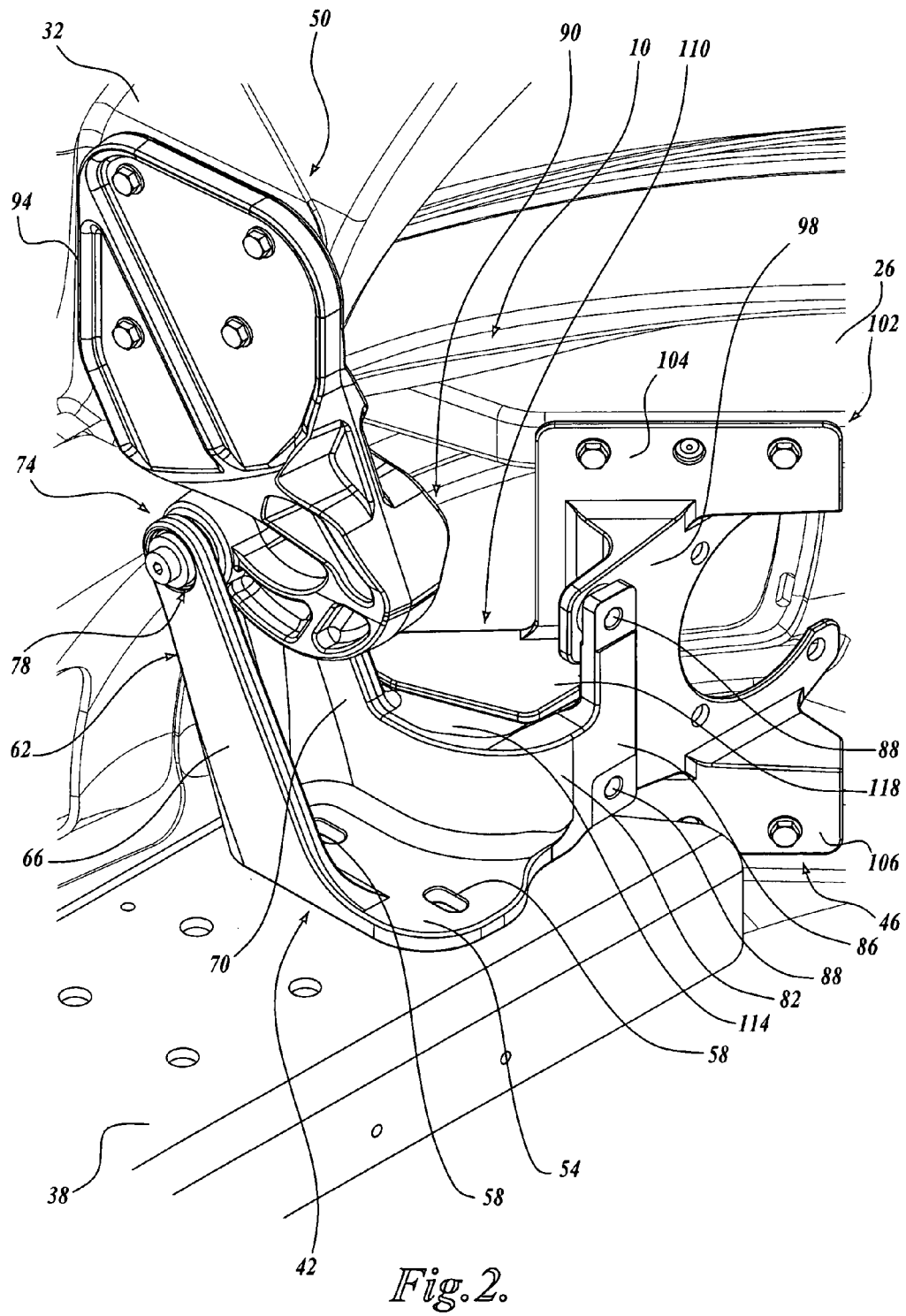
FIG. 2 is an isometric view of the bumper mounting system of FIG. 1.
Figure 3:
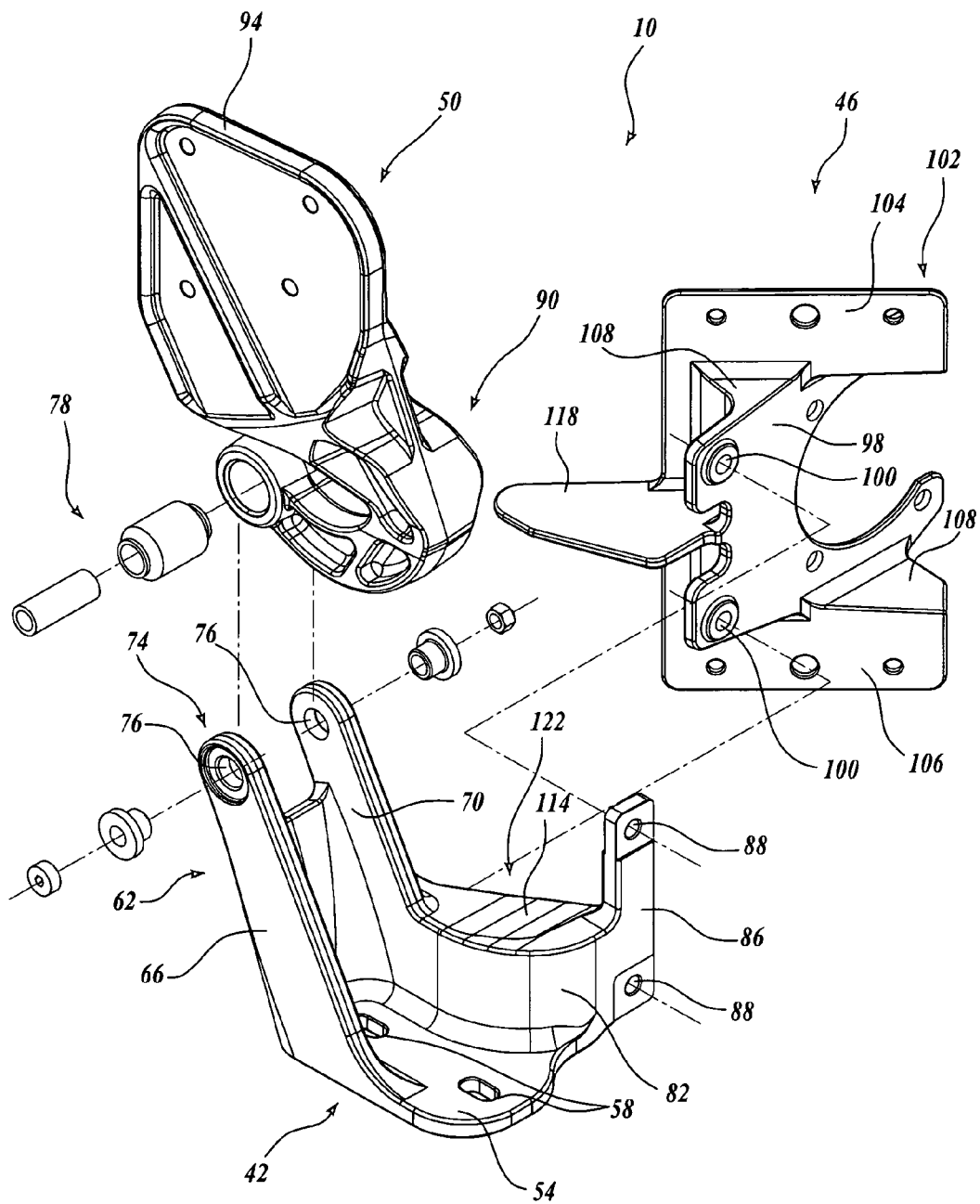
FIG. 3 is an exploded view of the bumper mounting system of FIG. 1.

Referring to FIGS. 2 and 3, the bumper mounting system 10 is primarily a three-part assembly consisting of a chassis support member 42 disposed between a bumper mounting member 46 and a hood support 50. Each part 42, 46, and 50 is formed from an appropriate material in a suitable, well-known manner; however, the parts 42, 46, and 50 are preferably cast from plastic or metal.

The chassis support member 42 includes a substantially flat, horizontal chassis mounting portion 54 that is adapted to be adjustably secured to a portion of the vehicle chassis, or a chassis cross-member 38. The chassis mounting portion 54 preferably includes at least two chassis mounting holes 58 for locating and securing the chassis support member 42 on the truck chassis cross-member 38. The chassis mounting holes 58 can be aligned with respective holes formed in the chassis cross-member 38 such that suitable fasteners (not shown) may be passed through both sets of holes to secure the chassis support member 42 to the chassis cross-member 38. Preferably, the chassis mounting holes 58 are elliptical or elongated in shape such that the position of the chassis support member 42 on the chassis cross-member 38 may be adjusted before the fasteners are tightened within the chassis mounting holes 58.

The chassis support member 42 further includes a clevis, or hood support mounting portion 62 defined by first and second sidewalls 66 and 68 that extend upwardly from two opposing sides of the chassis mounting portion 54 along its perimeter. The upper ends of the first and second sidewalls 66 and 68 include suitable holes 76 for receiving a bearing assembly 78. The hood support 50 is pivotally disposed between the first and second opposing sidewalls 66 and 68 through the bearing assembly 78 to define a hood pivot 74. Preferably, at least the front portion of the chassis mounting portion 54 remains open, i.e., does not include a side wall, such that an operator may access the chassis mounting holes 58 to secure the chassis mounting portion 54 to the chassis cross-member 38.

The chassis support member 42 is also mounted to the bumper mounting member 46 through a first mounting portion 86. The second side wall 68 extends along the length of the chassis mounting portion 54 and curves outwardly therefrom toward the bumper mounting member 46 to define a substantially vertical first mounting portion 86 that is substantially transverse to the longitudinal axis of the chassis mounting portion 54. The first mounting portion 86 includes at least two openings 88 adapted to receive any suitable fastener (not shown) that can pass through the first mounting portion 86 and at least a portion of the bumper mounting member 46 to couple the chassis support member 42 to the bumper mounting member 46.

Figure 4:
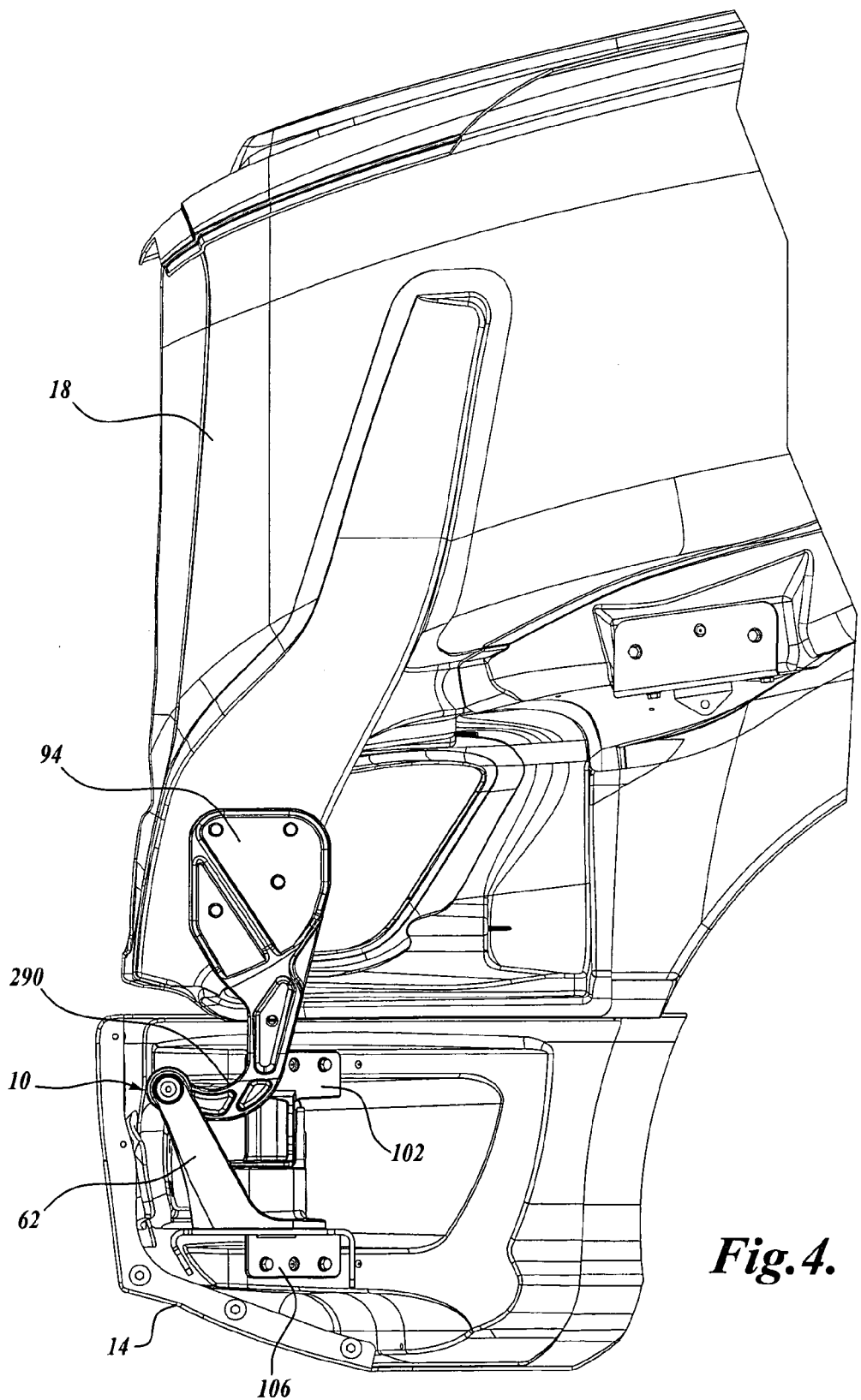
FIG. 4 is a side view of an alternate embodiment of the bumper mounting system of FIG. 1.

The hood support 50 is pivotally mounted to the first mounting portion 86 of the chassis support member 42 through the bearing assembly 78. The bearing assembly 78 may be any suitable bearing assembly, such as a ball bearing assembly, a roller bearing assembly, or a plain bearing assembly. The hood support 50 includes a link arm or J-hook bracket 90 that is pivotably mounted at the hook end to the hood support mounting portion 62. The J-hook bracket 90 may be any suitable shape, such as the tightly curved J-hook bracket shown in FIGS. 2 and 3, or in the alternative, the more open J-hook bracket 290 shown in FIG. 4. A hood attachment portion 94 is formed at the upper end of the J-hook bracket 90 and is securable to a portion of the hood reinforcement 34 in any suitable manner, such as with a plurality of fasteners. The J-hook bracket 90 is rotatable about the hood pivot 74 and enables the hood 18 to rotate upwardly and outwardly from the bumper 14. In this manner, when the hood 18 is lifted during installation or maintenance of the vehicle, it does not interfere with the bumper 14.

Still referring to FIGS. 2 and 3, the bumper mounting member 46 couples the chassis support member 42 to the bumper 14. The bumper mounting member 46 includes a substantially vertical second mounting portion 98 that is adapted to engage the first mounting portion 86 of the chassis support member 42. The second mounting portion 98 includes at least two holes 100 that align with holes 88 when the second mounting portion 98 engages the first mounting portion 86. A plurality of fasteners (not shown) are thereafter passed through holes 88 and 100 to secure the bumper mounting member 46 to the chassis support member 42.

The second mounting portion 98 extends toward the bumper 14 until it meets a mounting bracket portion 102. The mounting bracket portion 102 is substantially vertical and positioned at an angle to the second mounting portion 98 such that it may be mounted to a portion of the bumper reinforcement 26. Preferably, at least one gusset 108 or other support portion is disposed between the second mounting portion 98 and the mounting bracket portion 102 to provide structural support to the bumper mounting member 46. The mounting bracket portion 102 is taller than the second mounting portion 98 such that the top and bottom portions of the mounting bracket portion 102 extends upwardly and downwardly from the second mounting portion 98 to define first and second bumper mount portions 104 and 106. The first and second bumper mount portions 104 and 106 include a plurality of holes that are adapted to receive suitable fasteners. The fasteners are passed through the first and second bumper mount portions 104 and 106 and the bumper reinforcement 26 to secure the bumper mounting member 46 to the bumper 14.

Depending on the location of the bumper mounting member 46 on the bumper reinforcement 26, the bumper mounting member 46 may include at least one opening or recess for receiving, for example, a fog light or a headlamp. In such a case, a portion of the second mounting portion 98 and mounting bracket portion 102 is removed to allow the fog light to be mounted to the forward edge of the bumper 14.

The bumper mounting system 10 further includes a set and go feature 110 that allows the bumper 14 to be temporarily held in position on the vehicle during installation. This feature enables an installer to properly position the bumper 14 on the vehicle and thereafter retrieve fasteners for securing the bumper 14 to the vehicle. The set and go feature 110 is defined by first and second substantially horizontal and similarly-shaped bumper support features, or flanges 114 and 118. The first flange 114 extends outwardly and substantially horizontally from the chassis support member 42 along a portion of the second side wall 68 and the first mounting portion 86. The first flange 114 extends toward the bumper mounting member 46 to define a bottom support flange on which the second flange 118 may rest. Moreover, the first flange 114 is positioned on the exterior of the second sidewall 68 and the first mounting portion 86 such that first flange 114, the second sidewall 68, and the first mounting portion 86 cooperatively define a flange-receiving cavity 122.

The second flange 118 is formed substantially horizontally on the bumper mounting member 46 and extends outwardly therefrom towards the chassis support member 42. Preferably the second flange 118 is positioned substantially in the center of the bumper mounting member 46 and engages both the mounting bracket portion 102 and the second mounting portion 98.

The first and second flanges 114 and 118 are shaped and positioned such that when the bumper 14 is slid into position on the vehicle, the second flange 118 slides on top and engages the first flange 114 to hold the bumper 14 on the vehicle. The bumper 14 is moved until the second flange 118 is received within the flange-receiving cavity 122. At this point, the bumper 14 is properly located on the vehicle with respect to the hood. Moreover, while the bumper 14 is temporarily held on the vehicle, the installer can retrieve fasteners for permanently securing the bumper 14 to the vehicle. In this manner, only one installer is needed to properly install the bumper 14 on the vehicle.

The preferred method of installing a hood 18 and bumper 14 on a vehicle having a bumper mounting system 10 involves several steps, all of which may be modified or re-ordered as needed without departing from the scope of the present disclosure. First, the hood support 50 and chassis support member 42 are pivotally coupled together at the hood pivot 74, and the hood support 50 is thereafter mounted to the hood 18 in the manner described above. The hood support 50 and chassis support member 42 are preferably pre-installed on the hood 18 such that the hood 18 is ready for immediate installation on the assembly line.

After the hood support 50 and chassis support member 42 are mounted to the hood 18, the hood 18 is adjustably located on the chassis cross member 38 of the vehicle. Fasteners are passed through the chassis mounting holes 58 of the chassis support member 42 and the holes in the chassis cross-member 38 to loosely secure the hood 18 to the chassis cross member 38. The hood 18 is thereafter adjusted until the desired position and hood to cab cowl gap (not shown) is obtained. Once the hood 18 is properly located, the fasteners in the chassis support member 42 and the chassis cross-member 38 are tightened to secure the hood 18 to the vehicle chassis.

After locating the hood 18 on the chassis cross-member 38, the bumper mounting member 46 is mounted to the bumper reinforcement 26 of the bumper 14 in the manner described above. Preferably, the bumper mounting member 46 is pre-installed on the bumper 14 such that the bumper 14 is ready for immediate installation on the assembly line. Using the set and go feature 110, the bumper 14 is located on the vehicle in the manner described above. The location of the set and go feature 110 is defined by the position of the chassis support member 42, which is determined by the position of the hood support 50 and the hood 18. Thus, adjustment of the hood 18 prior to installation simultaneously adjusts and properly positions the bumper 14 through the set and go feature 110 to produce a substantially consistent gap between the hood and bumper each time.

After setting the bumper position with the set and go feature 110, the installer retrieves the needed fasteners to fixedly secure the bumper 14 to the vehicle. Fasteners are passed through both the first mounting portion 86 and the second mounting portion 98 to mount the bumper mounting member 46 to the chassis support member 42, thereby mounting the bumper 14 to the chassis cross-member 38 and hood 18.

If after the bumper 14 is installed it is determined the hood to cab cowl gap is not within the standards of the installation, any adjustments made to hood 18 necessarily cause the bumper 14 to move in concert, thereby maintaining the hood to bumper gap standards. Thus, as an alternative to the installation method described above, it should be appreciated that the bumper 14 may instead be secured to the bumper mounting member 46 after the hood 18 is installed but before any hood adjustments are made.

While the preferred embodiment of the invention has been illustrated and described, it will be appreciated that various changes can be made therein without departing from the spirit and scope of the present disclosure.

The embodiments of the invention in which an exclusive property or privilege is claimed are defined as follows:

1. A bumper mounting system for locating and installing a bumper on a vehicle having a chassis and a hood, the system comprising:
   (a) a hood support fixedly secured to the portion of the vehicle hood;
   (b) a chassis support member pivotally mounted to the hood support and fixedly mounted to a portion of the vehicle chassis;
   (c) a bumper mounting member fixedly mounted to both an interior portion of the bumper and a portion of the chassis support member, such that the bumper mounting member and the bumper do not pivot with the hood support and the hood; and
   (d) a first bumper support feature formed on the chassis support member and a second bumper support feature formed on the bumper mounting member wherein the second bumper support feature is engageable with the a first bumper support feature to at least temporarily position the bumper relative to the hood.

2. The bumper mounting system of claim 1, wherein the second bumper support feature is engageable with the first bumper support feature to temporarily hold the bumper on the vehicle.

3. The bumper mounting system of claim 1, wherein the first bumper support feature is a first flange.

4. The bumper mounting system of claim 3, wherein the first flange and a portion of the chassis support feature cooperatively define a flange receiving cavity.

5. The bumper mounting system of claim 4, wherein the second bumper support feature is a second flange that is slidably receivable within the flange receiving cavity.

6. The bumper mounting system of claim 5, wherein the second bumper support feature is slidably receivable on the first bumper support feature.

7. The bumper mounting system of claim 6, wherein the chassis support member is fixedly attachable to the bumper mounting member.

8. A method for locating and mounting a bumper on a vehicle having a chassis and a hood, the method comprising:
   (a) adjustably securing the hood on the chassis of the vehicle through a chassis support member, wherein the hood is pivotally secured to the chassis support member;
   (b) moving the hood into a predetermined position on the vehicle;
   (c) fixedly securing the chassis support member to the chassis of the vehicle when the hood is in the predetermined position;
   (d) engaging a portion of the bumper with a portion of the chassis support member to at least temporarily position the bumper relative to the hood; and
   (e) fixedly securing the bumper to the chassis support member, such that the bumper does not pivot with the hood.

9. The method of claim 8, further comprising securing a bumper mounting member to an interior portion of the bumper.

10. The method of claim 9, wherein the chassis support member includes a first bumper support feature, and the bumper mounting member includes a second bumper support feature.

11. The method of claim 10, wherein the first bumper support feature is a first flange, and the second bumper support feature is a second flange.

12. The method of claim 11, wherein the first flange and a portion of the chassis support member cooperatively define a flange receiving cavity.

13. The method of claim 12, further comprising sliding the second flange into the flange receiving cavity to temporarily position the bumper on the vehicle relative to the hood.

14. A method for locating and mounting a bumper on a vehicle having a chassis and a hood, the method comprising:
   (a) adjustably mounting the hood to the chassis through a chassis support member, wherein the hood is pivotally secured to the chassis support member, and wherein the chassis support member has a first bumper support feature;

(b) providing a bumper having a bumper mounting member, wherein the bumper mounting member has a second bumper support feature;
(c) sliding the bumper into engagement with the vehicle such that the second bumper support feature engages the first bumper support feature to temporarily position the bumper relative to the hood;
(d) moving the hood into a predetermined position on the vehicle;
(e) fixedly securing the chassis support member to the chassis when the hood is in the predetermined position; and
(f) fixedly securing the bumper mounting member to the chassis support member to fixedly secure the bumper to the vehicle, such that the bumper does not pivot with the hood.

15. The method of claim 14, further comprising pivotally mounting the hood to the chassis support member.

16. The method of claim 15, wherein the first bumper support member is a first flange.

17. The method of claim 16, wherein the first flange and a portion of the chassis support feature cooperatively define a flange receiving cavity.

18. The method of claim 17, wherein the second bumper support feature is a second flange.

19. The method of claim 18, further comprising sliding the second flange into the flange receiving cavity to temporarily position the bumper on the vehicle.

20. A bumper mounting system for locating and installing a bumper on a vehicle having a chassis and a hood, the system comprising:
(a) a chassis support member fixedly mountable to a portion of the vehicle chassis and pivotally mountable to a portion of the vehicle hood such that the vehicle hood may pivot with respect to the chassis support member;
(b) a bumper mounting member fixedly mountable to both an interior portion of the bumper and a portion of the chassis support member, such that when fixedly mounted, the bumper mounting member and the bumper do not pivot with the vehicle hood; and
(c) a first bumper support feature formed on the chassis support member and a second bumper support feature formed on the bumper mounting member, wherein the second bumper support feature is engageable with the first bumper support feature to temporarily align the bumper relative to the hood before the bumper mounting member is fixedly mounted to the portion of the chassis support member.

* * * * *